C. H. LAVIS.

Loading Cartridges.

No. 1,858. Reissued Jan. 31, 1865.

Witnesses

F. W. Dougherty

William Delany

Inventor

Charles H. Lavis

N. PETERS, PHOTO-LITHOGRAPHER, WASHINGTON, D. C.

UNITED STATES PATENT OFFICE.

CHARLES H. LAVIS, OF PHILADELPHIA, PENNSYLVANIA.

IMPROVEMENT IN MACHINES FOR LOADING METALLIC CARTRIDGE-CASES.

Specification forming part of Letters Patent No. 43,780, dated August 9, 1864; Reissue No. 1,858, dated January 31, 1865.

*To all whom it may concern:*

Be it known that I, CHARLES H. LAVIS, of Philadelphia, in the county of Philadelphia, in the State of Pennsylvania, have invented a new and useful improvement in the manufacture of metallic cartridges by means of raising the shells or cases, whereby their manufacture is greatly facilitated and economized; and I do hereby declare the following to be a full, clear, and exact description of the same, reference being had to the accompanying drawings, and to the letters of reference marked thereon.

My invention consists in raising the shells or cases of metallic cartridges so that the operations of loading them with powder, inserting the ball, and crimping the shell or case to the ball may all be done successively and upon the same machine.

In order to enable skilled mechanics to construct such machine and put my invention into practice, I do now proceed to describe it.

Figure 1:
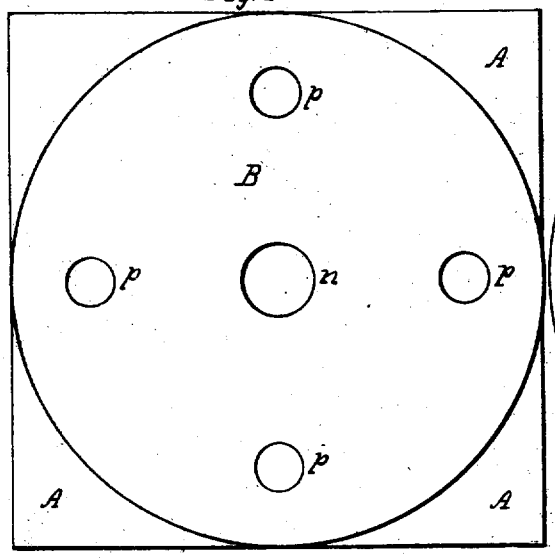
Figure 2:
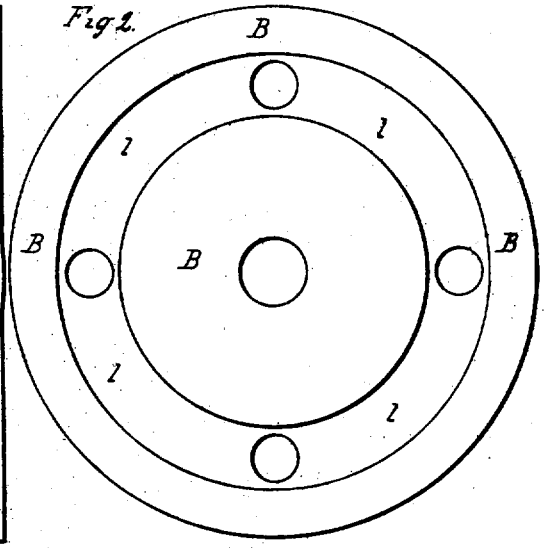
Figure 3:
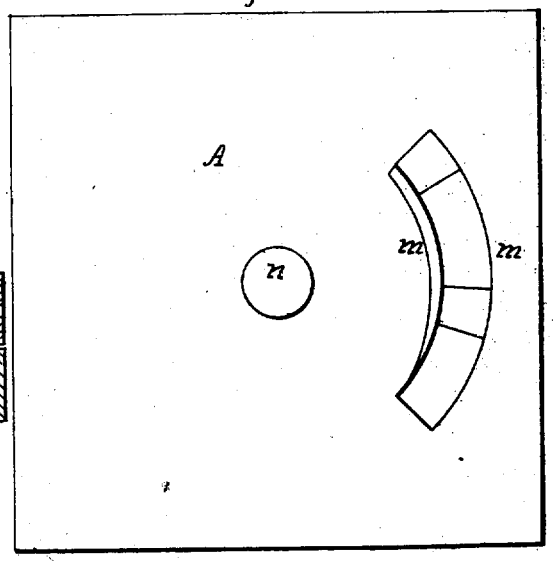
Figure 4:
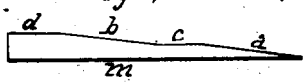
Figure 5:
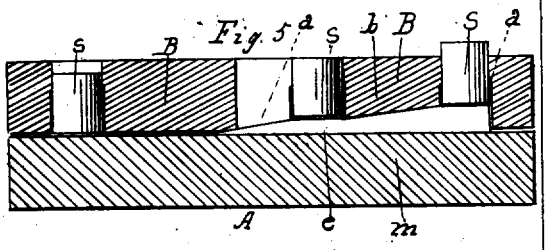

On reference to the accompanying drawings, which form part of this specification, Figure 1 is a plan view, showing bed-plate A and loading-wheel B. Fig. 2 is a view of the under side of the loading-wheel B, showing the groove *l*. Fig. 3 is a plan of the bed-plate A, showing the block *m*. Fig. 4 is a side view of the block *m*, and Fig. 5 is a vertical section of Fig. 1.

Similar letters refer to similar parts throughout the several views.

A is the bed-plate of this machine, upon which and around the stud *n* the loading-wheel B revolves.

*p* are holes in the loading-wheel for receiving the shells or cases of the cartridges, of which any number may be used.

*l* is a groove cut on the under side of the loading-wheel B, for the purpose of receiving the block *m* and allowing the shells or cases to raise and lower.

*m* is a block, which is fastened to the bed-plate A, and has on its face two inclined planes, *a* and *b*, and two or more resting-flats, *c* and *d*.

The shells or cases *s*, having first received their proper supply of detonate, are inserted into the holes *p* of the loading-wheel B, (except those directly over the block *m*,) their rims being slightly lower than its face. The powder is then inserted. The loading-wheel making one-fourth of a revolution carries the shell or case up the first inclined plane, *a*, (block *m*,) to the first resting-flat, *c*, which raises its rim to the surface of the loading-wheel, where the ball is inserted. The loading-wheel making another quarter-revolution, the shell or case is carried up the second inclined plane, *b*, to the second resting-flat, *d*, where the rim of the shell is sufficiently projected above the face of the loading-wheel to allow the crimping-tool to crimp the shell or case to the ball, which being done the cartridge is completed. Another revolution allows the cartridge to drop and be removed by the person attending the machine.

By the present method of making cartridges loading-wheels of different thicknesses are used suited to the different lengths of cartridge required. I use the same loading-wheel for all cartridges, but substituting blocks suitable to the lengths required.

What I claim as my invention, and desire to secure by Letters Patent, is—

1. Raising the shell or case of the metallic cartridge, for the purposes as herein shown and described.
2. The block *m* or its equivalent, for the purpose specified.
3. The groove *l* in the loading-wheel, for the purpose set forth.
4. The combination of the block *m* and groove *l*, as substantially described.

CHARLES H. LAVIS.

Witnesses:
W. W. DOUGHERTY,
GEO. WHITE.